(12) United States Patent
Chung et al.

(10) Patent No.: US 11,946,733 B2
(45) Date of Patent: Apr. 2, 2024

(54) IMAGE RENDERING DEVICE AND IMAGE RENDERING METHOD

(71) Applicant: eYs3D Microelectronics, Co., Taipei (TW)

(72) Inventors: Kuan-Cheng Chung, Taipei (TW); Tsung-Yi Huang, Taipei (TW); Shi-Fan Chang, Taipei (TW)

(73) Assignee: EYS3D MICROELECTRONICS CO., Taipei (TW)

( * ) Notice: Subject to any disclaimer, the term of this patent is extended or adjusted under 35 U.S.C. 154(b) by 390 days.

(21) Appl. No.: 17/501,834

(22) Filed: Oct. 14, 2021

(65) Prior Publication Data

US 2022/0122315 A1 Apr. 21, 2022

Related U.S. Application Data

(60) Provisional application No. 63/091,322, filed on Oct. 14, 2020.

(51) Int. Cl.
*G01B 11/25* (2006.01)
*G06T 15/50* (2011.01)

(52) U.S. Cl.
CPC ........ *G01B 11/2513* (2013.01); *G06T 15/506* (2013.01)

(58) Field of Classification Search
CPC .............. F28D 15/0233; G06T 15/506; H05K 7/20336; G01B 11/2513
USPC .......................................................... 356/603
See application file for complete search history.

(56) References Cited

FOREIGN PATENT DOCUMENTS

| CN | 104702933 A | 6/2015 |
| CN | 110493587 A | 11/2019 |

OTHER PUBLICATIONS

Taiwan Office Action corresponding to Application No. 110138174 dated Sep. 30, 2022, 9 pages.

*Primary Examiner* — Tri T Ton
(74) *Attorney, Agent, or Firm* — Innovation Counsel LLP

(57) ABSTRACT

An image rendering device and an image rendering method are disclosed. For the elements of the image rendering device, a first sensor and a second sensor are configured to sense a target object in a two-dimensional (2D) mode and three-dimensional (3D) mode to generate a first surface-color-signal, a first 3D-depth-signal, a second surface-color-signal and a second 3D-depth-signal respectively. An IR projector is configured to generate an IR-dot-pattern. A processor is configured to control the IR projector to project the IR-dot-pattern on the target object in the 3D mode, and configured to process the first surface-color-signal, the second surface-color-signal, the first 3D-depth-signal and the second 3D-depth-signal to obtain a color 3D model of the target object.

17 Claims, 10 Drawing Sheets

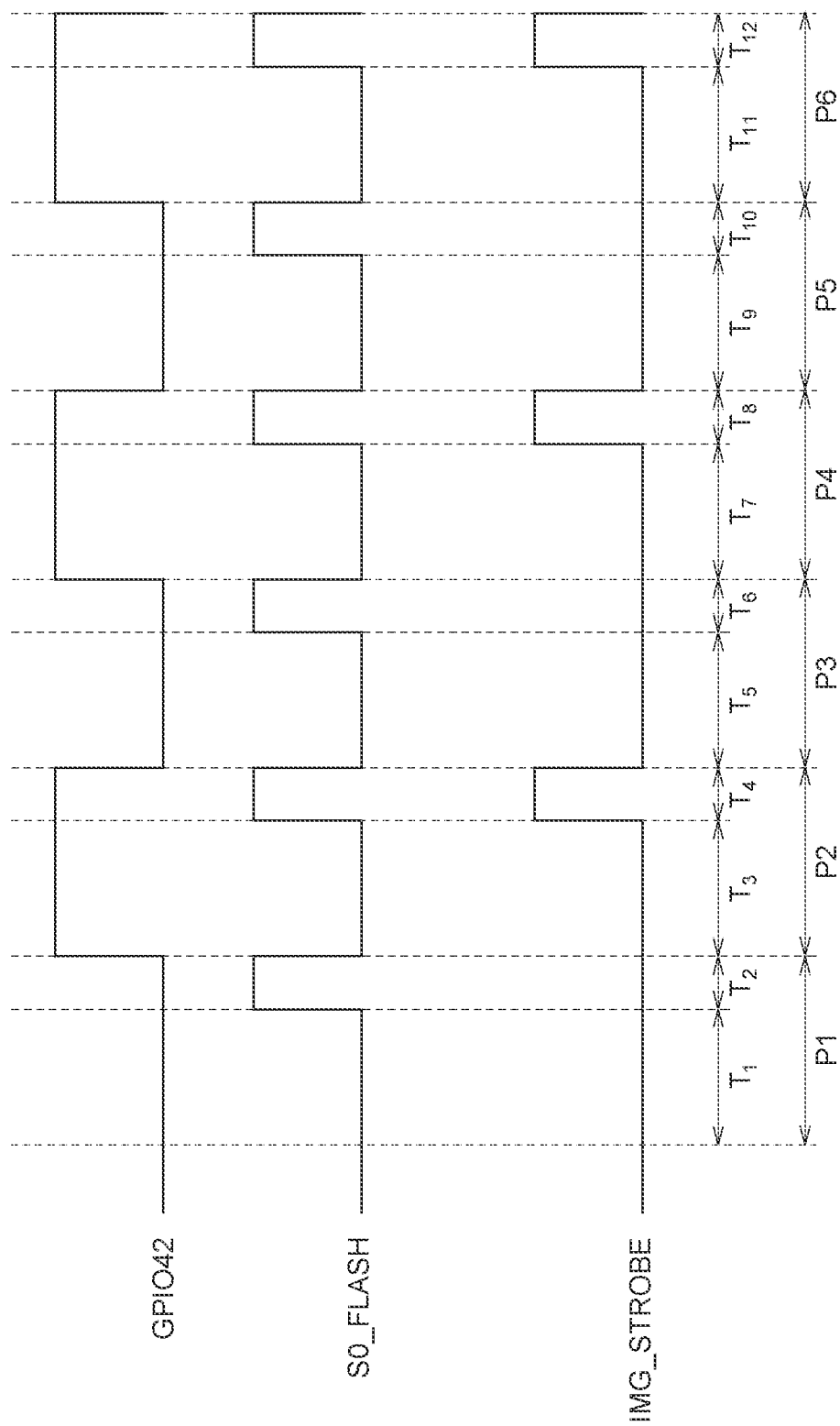

IMAGE RENDERING DEVICE AND IMAGE RENDERING METHOD

This application claims the benefit of U.S. provisional application Ser. No. 63/091,322, filed Oct. 14, 2020, the subject matter of which is incorporated herein by reference.

TECHNICAL FIELD

The disclosure relates to an image processing device and an image processing method, particularly relates to an image rendering device and an image rendering method for generating a color three-dimensional (3D) model of a target object.

BACKGROUND

With the evolution of technology of semiconductor device and digital signal processing, artificial intelligence and virtual reality have been widely used in daily life. 3D image rendering technology of virtual reality can be used to generate image of color 3D model of the target object. For example, in the surgical operating room, 3D image rendering technology is used to generate image of the color 3D model of the affected organs or tissues of the patient for the doctor to clearly observe the affected organs or tissues, so that operation may be facilitated.

FIG. 1 is an image rendering device 100a using 3D image rendering technology of the prior art. Please refer to FIG. 1, the image rendering device 100a of the prior art may be, for example, a chip product "RealSense D435i" of Intel Corp. This image rendering device 100a is provided with three image sensors 10, 20, and 30. Wherein image sensors 10 and 20 are dedicated to sense 3D depth information of target object 800 in a 3D mode, and the other image sensor 30 is dedicated to sense surface color image of the target object 800 in a 2D mode. Then, the processor 40 integrates the 3D depth information and the surface color image to obtain a color 3D model of the target object 800. However, the image rendering device 100a of the prior art needs to dispose at least three image sensors 10, 20, and 30, which may greatly increase the hardware cost, power consumption, and overall weight of the device.

In view of the above-mentioned technical problems of the prior art, skilled ones of related industries in this field are devoted to develop improved 3D image rendering devices, so as to have a lower number of needed image sensors and to reduce hardware cost and power consumption.

SUMMARY

According to one aspect of this disclosure, an image rendering device is provided. The image rendering device comprises a first sensor, a second sensor, an IR projector and a processor. The first sensor is configured to sense a target object in a three-dimensional (3D) mode to generate a first 3D-depth-signal, and sense the target object in a two-dimensional (2D) mode to generate a first surface-color-signal. The second sensor is configured to sense the target object in the 3D mode to generate a second 3D-depth-signal, and sense the target object in the 2D mode to generate a second surface-color-signal. The IR projector is configured to generate an IR dot pattern. The processor is configured to control the IR projector to project the IR dot pattern on the target object in the 3D mode, and process the first surface-color-signal, the second surface-color-signal, the first 3D-depth-signal and the second 3D-depth-signal to obtain a color 3D model of the target object.

In one example of the image rendering device, further comprises a driving circuit configured to generate a driving-signal, and drive the IR projector by the driving-signal to generate the IR dot pattern in the 3D mode, wherein the processor further generates a control-signal, and control the driving circuit by the control-signal to generate the driving-signal in the 3D mode.

In one example of the image rendering device, wherein the first sensor and the second sensor further generate a strobe-control-signal, and when the first sensor and the second sensor actually sense the target object, the strobe-control-signal is used to control the driving circuit to generate the driving-signal.

In one example of the image rendering device, wherein the driving circuit comprises an AND gate circuit configured to perform a logic AND operation on the strobe-control-signal and the control-signal to obtain an enabling-signal, and a load switch configured to generate the driving-signal, and control the driving-signal by the enabling-signal, wherein, when operating in the 3D mode and when the first sensor and the second sensor actually sense the target object, the strobe-control-signal, the control-signal and the enabling-signal are all in a enabled state so as to control the driving-signal as being in the enabled state.

In one example of the image rendering device, wherein the load switch is a high-speed switch of a solid-state device, the load switch has a discharging path to rapidly discharge the driving-signal, and the discharging path has a resistor and a capacitor used to adjust the discharging speed of the driving-signal.

In one example of the image rendering device, wherein the processor is configured to process the first surface-color-signal and the second surface-color-signal to obtain a plurality of 2D-image-frames and form a frame sequence of the 2D-image-frames, and process the first 3D-depth-signal and the second 3D-depth-signal to obtain a plurality of 3D-image-frames and form a frame sequence of the 3D-image-frames, and integrate the 2D-image-frames and the 3D-image-frames as a plurality of total-image-frames and from a frame sequence of the total-image-frames, and process the total-image-frames to obtain a color 3D model of the target object.

In one example of the image rendering device, wherein the processor is configured to set a count value in the total-image-frames, and values of odd number or even number of the count value correspond to the 2D-image-frames or the 3D-image-frames.

In one example of the image rendering device, wherein the first sensor and the second sensor further generate a synchronization-control-signal, and the processor is configured to accumulate the count value according to the synchronization-control-signal.

In one example of the image rendering device, wherein the processor is configured to perform brightness processing and white balance processing on the 2D-image-frames and the 3D-image-frames to obtain a plurality of parameter calibration values, and to calibrate the first sensor and the second sensor according to the parameter calibration values.

According to one aspect of this disclosure, an image rendering method is provided. The image rendering method comprises the following steps. Generating an infrared ray (IR) dot pattern by an IR projector. Projecting the IR dot pattern on the target object in a three-dimensional (3D) mode. Sensing the target object by the first sensor in the 3D mode to generate a first 3D-depth-signal. Sensing the target object by the second sensor in the 3D mode to generate a second 3D-depth-signal. Sensing the target object by the first sensor in a two-dimensional (2D) mode to generate a first surface-color-signal. Sensing the target object by the second sensor in the 2D mode to generate a second surface-color-signal. Processing the first surface-color-signal and the second surface-color-signal to obtain a plurality of 2D-image-frames and forming a frame sequence of the 2D-image-frames. Processing the first 3D-depth-signal and the second 3D-depth-signal to obtain a plurality of 3D-image-frames and forming a frame sequence of the 3D-image-frames. Integrating the 2D-image-frames and the 3D-image-frames as a plurality of total-image-frames and forming a frame sequence of the total-image-frames. Processing the total-image-frames to obtain a color 3D model of the target object.

In one example of the image rendering method, further comprising the following steps. Generating a driving-signal by a driving circuit. Driving the IR projector by the driving-signal to generate the IR dot pattern in the 3D mode. Generating a control-signal. Controlling the driving-signal by the control-signal in the 3D mode.

In one example of the image rendering method, further comprising the following steps. Generating a strobe-control-signal by the first sensor and the second sensor. When the first sensor and the second sensor actually sense the target object, controlling the driving-signal by the strobe-control-signal.

In one example of the image rendering method, wherein the driving circuit comprises an AND gate circuit and a load switch, and the image rendering method further comprising the following steps. Performing a logic AND operation on the strobe-control-signal and the control-signal by the AND gate circuit to obtain an enabling-signal. Generating the driving-signal by the load switch, and controlling the driving-signal by the enabling-signal. Wherein, when operating in the 3D mode and when the first sensor and the second sensor actually sense the target object, the strobe-control-signal, the control-signal and the enabling-signal are all in an enabled state so as to control the driving-signal as being in the enabled state.

In one example of the image rendering method, wherein the load switch is a high-speed switch of a solid-state device, the load switch has a discharging path and the discharging path has a resistor and a capacitor, and the image rendering method further comprising the following steps. Rapidly discharging the driving-signal through the discharging path. Adjusting discharging speed of the driving-signal by tuning the resistance and the capacitance of the discharging path.

In one example of the image rendering method, further comprising the following steps. Setting a count value in the total-image-frames. Corresponding values of odd number or even number of the count value to the 2D-image-frames or the 3D-image-frames respectively.

In one example of the image rendering method, further comprising the following steps. Generating a synchronization-control-signal by the first sensor and the second sensor. Accumulating the count value according to the synchronization-control-signal.

In one example of the image rendering method, further comprising the following steps. Performing brightness processing and white balance processing on the 2D-image-frames and the 3D-image-frames respectively to obtain a plurality of parameter calibration values. Calibrating the first sensor and the second sensor according to the parameter calibration values.

BRIEF DESCRIPTION OF THE DRAWINGS

FIGS. 5A and 5B are timing diagrams of the control signals of the driving circuit according to an embodiment of this disclosure.

Figure 1:
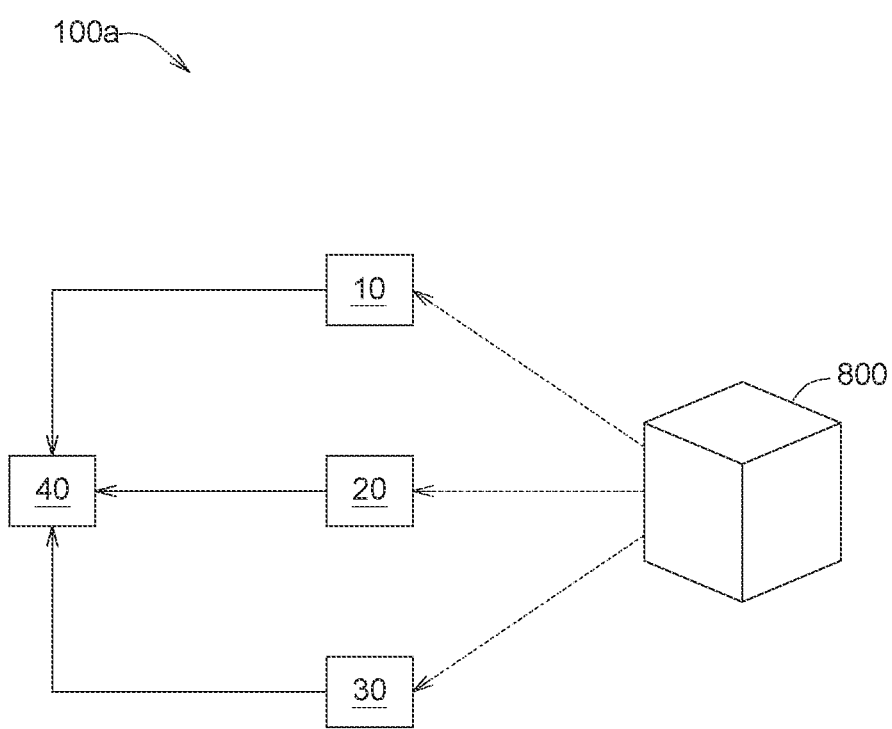
FIG. 1 is an image rendering device 100*a* using 3D image rendering technology in the prior art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 2:
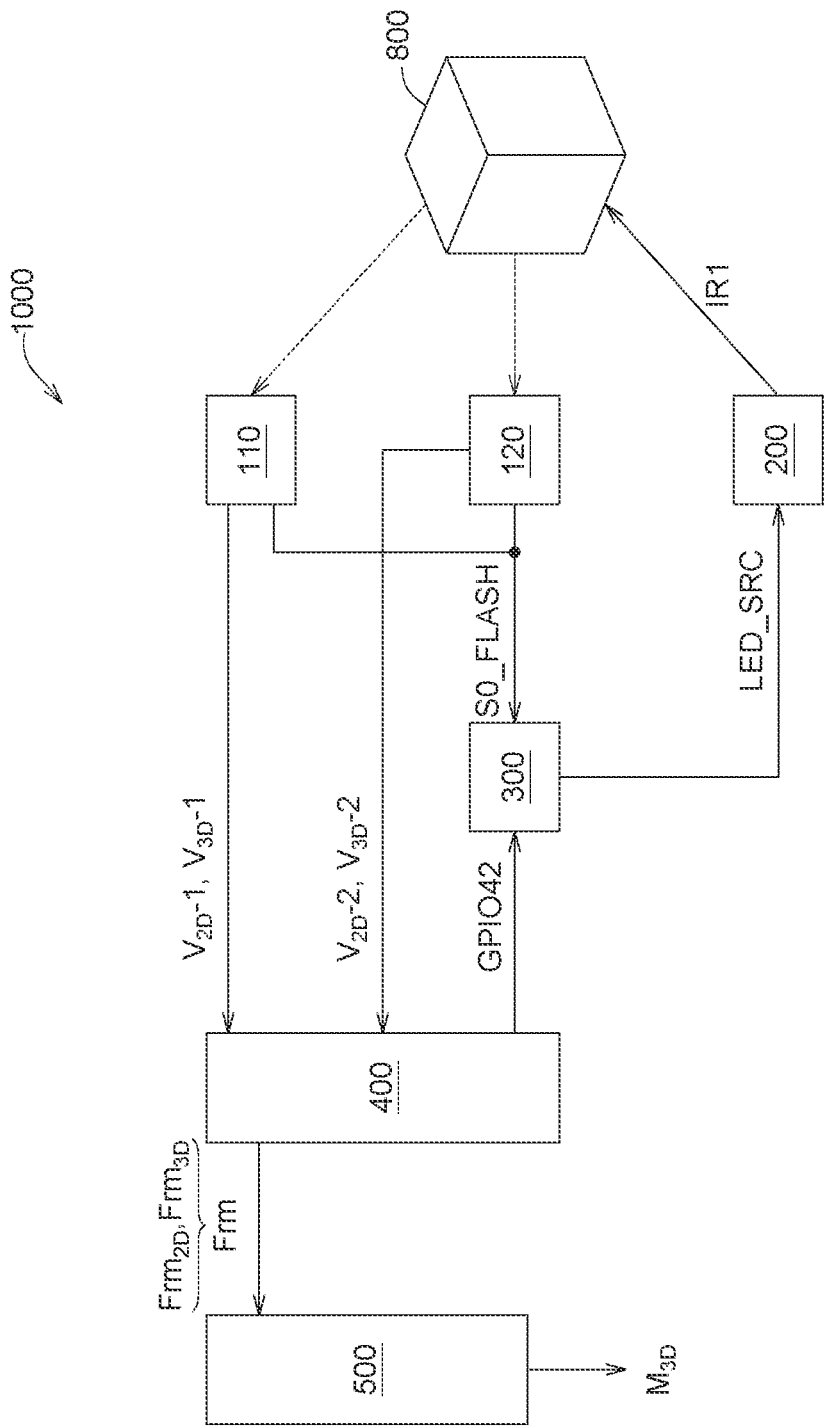
FIG. 2 is a block diagram of the imaging rendering device according to an embodiment of this disclosure.

Please refer to FIG. 2, which illustrates a block diagram of an imaging rendering device 1000 according to an embodiment of this disclosure. Two sensors may be needed to be disposed in the imaging rendering device 1000 of this disclosure, which refer to a first sensor 110 and a second sensor 120. The imaging rendering device 1000 may employ a driving circuit 300 to control an infrared ray (IR)-dot-pattern IR1 in a interleaved manner, so that the IR-dot-pattern IR1 may be selectively projected on the target object 800 in a 3D mode, and the IR-dot-pattern IR1 may be turned off in a 2D mode. with the projection of the IR-dot-pattern IR1 performed selectively, the first sensor 110 and the second sensor 120 are used to sense 3D depth information and surface color image of the target object 800 in both the 3D mode and the 2D mode. Accordingly, the imaging rendering device 1000 of this disclosure may not require an additional sensor to sense the surface color image of the target object 800 in the 2D mode. Therefore, the imaging rendering device 1000 of this disclosure may save at least one sensor, and cost and power consumption may be greatly reduced.

In addition to the first sensor 110 and the second sensor 120, the imaging rendering device 1000 as shown in FIG. 2 also includes an infrared ray projector 200 (referred to as "IR projector 200"), a driving circuit 300, an image processor 400, and a back-end processor 500. In this embodiment, the image processor 400 and the back-end processor 500 are taken as an example to describe functions of processor(s), however, in other embodiments of this disclosure a single processor may be used to achieve functions of the image processor 400 and the back-end processor 500. In addition, the first sensor 110 and the second sensor 120 of this embodiment are, for example, various types of sensors, still image cameras or video cameras with image sensing function or image capturing function, which can be respectively disposed in two positions of front end of the device 1000, so as to sense the target object 800 from at least two shooting angles respectively. Compared with at least three sensors are employed in the prior art, for the embodiment of this disclosure can reduce at least one sensor and hence save hardware cost, power consumption and overall volume. In this embodiment, the imaging rendering device 1000 can operate in a 2D mode and a 3D mode. In the 2D mode, the first sensor 110 and the second sensor 120 may sense the target object 800 to capture a 2D color image of the surface of the target object 800. Furthermore, the first sensor 110 may generate a first surface-color-signal $V_{2D}$-1 and the second sensor 120 may generate a second surface-color-signal $V_{2D}$-2 accordingly. On the other hand, in the 3D mode, the first sensor 110 and the second sensor 120 may capture the 3D depth information (referred to as "3D depth map") of the target object 800, and the first sensor 110 may generate a first 3D-depth-signal $V_{3D}$-1, and the second sensor 120 may generate a second 3D-depth-signal $V_{3D}$-2 accordingly.

In addition, the first sensor 110 and the second sensor 120 may further generate a strobe-control-signal S0_FLASH. Only when the first sensor 110 and the second sensor 120 are actually powered on and enter a "working state" to actually sense the target object 800, the strobe-control-signal S0_FLASH may be in an enabled state (for example, a state of high voltage level). Accordingly, whether the strobe-control-signal S0_FLASH is in the enabled state may indicate whether the first sensor 110 and the second sensor 120 actually sense the target object 800.

The IR projector 200 may be, for example, a "Vertical Cavity Surface Emitting Laser (VCSEL)", which may be configured to generate an IR-dot-pattern IR1 in the form of infrared ray. When the imaging rendering device 1000 operates in the 3D mode, the IR projector 200 may be configured to project the IR-dot-pattern IR1 on the surface of the target object 800 to generate surface textures and assist in illuminating recesses or shadows of the target object 800, so as to facilitate the first sensor 110 and the second sensor 120 to sense and capture 3D depth information (i.e., 3D depth map) of the target object 800.

The driving circuit 300 may be configured to drive the IR projector 200 to generate an IR-dot-pattern IR1 and control the IR projector 200 to turn on/off the IR-dot-pattern IR1. When the imaging rendering device 1000 operates in the 3D mode, the IR projector 200 may generate an IR-dot-pattern IR1 and project it on the target object 800. However, when the imaging rendering device 1000 operates in the 2D mode, the IR projector 200 must stop projecting the IR-dot-pattern IR1 on the target object 800 so as to prevent the IR-dot-pattern IR1 from interfering the surface color image of the target object 800. Therefore, the driving circuit 300 may drive the IR projector 200 to generate and project the IR-dot-pattern IR1 in the 3D mode, and turns off the IR projector 200 in the 2D mode to stop providing the IR-dot-pattern IR1. In this embodiment, the driving circuit 300 may generate a driving-signal LED_SRC, thereby driving and controlling the IR projector 200 through the driving-signal LED_SRC, in the 3D mode.

After the first sensor 110 and the second sensor 120 sense the target object 800-1, the first surface-color-signal $V_{2D}$-1, the second surface-color-signal $V_{2D}$-2, the first 3D-depth-signal $V_{3D}$-1 and the second 3D-depth-signal $V_{3D}$-2 may be generated and then sent to the image processor 400 for processing. The image processor 400 may be a processor with functions of image and signal processing, such as a microprocessor (MCU) or a digital signal processor (DSP). The image processor 400 may be used to process the first surface-color-signal $V_{2D}$-1 and the second surface-color-signal $V_{2D}$-2 to obtain a plurality of 2D-image-frames (referred to as "$Frm_{2D}$"), which may then form a "sequence"

of 2D-image-frames $Frm_{2D}$. The image processor 400 may also process the first 3D-depth-signal $V_{3D}$-1 and the second 3D-depth-signal $V_{3D}$-2 to obtain a plurality of 3D-image-frames (referred to as "$Frm_{3D}$"), which may then form a "sequence" of 3D-image-frames $Frm_{3D}$. In addition, the image processor 400 may integrate the sequence of 2D-image-frames $Frm_{2D}$ and the sequence of 3D-image-frames $Frm_{3D}$ into a single frame sequence, and this single frame sequence refers to a sequence of total-image-frames "Frm".

In addition, the image processor 400 may further generate a control-signal GPIO42. In the 3D mode, the driving circuit 300 may be controlled by the control-signal GPIO42 to generate a driving-signal LED_SRC. In this embodiment, when the imaging rendering device 1000 operates in the 3D mode, the control-signal GPIO42 is in an enabled state (for example, a state of high voltage level) so as to control the driving-signal LED_SRC of the driving circuit 300 to be in an enabled state, thereby driving the IR projector 200 to generate the IR-dot-pattern IR1. On the other hand, when the imaging rendering device 1000 operates in the 2D mode, the control-signal GPIO42 is in a disabled state (for example, a low voltage potential state) to control the driving-signal LED_SRC of the driving circuit 300 to be in a disabled state, and then turn off the IR projector 200.

In addition, the strobe-control-signal S0_FLASH generated by the first sensor 110 and the second sensor 120 may be also transmitted to the driving circuit 300, and the strobe-control-signal S0_FLASH can be used to control the driving circuit 300 to generate the driving-signal LED_SRC. Accordingly, the driving circuit 300 may generate the driving-signal LED_SRC according to the control-signal GPIO42 provided by the image processor 400 and the strobe-control-signal S0_FLASH provided by the first sensor 110 and the second sensor 120 correspondingly. In this embodiment, when the imaging rendering device 1000 operates in a 3D mode and when the first sensor 110 and the second sensor 120 actually sense the target object 800, the strobe-control-signal S0_FLASH and the control-signal GPIO42 are both in enabled state (for example, a state of high voltage level), the driving circuit 300 may generate the driving-signal LED_SRC in an enabled state (for example, a state of high voltage level).

The back-end processor 500 may refer to, for example, a personal computer, a mobile device or any type of terminal device. The back-end processor 500 can execute a software program or a firmware program to process the frame sequence of the total-image-frames Frm, so as to obtain a color 3D model "$M_{3D}$" of the target object 800. In this embodiment, the back-end processor 500 can build points-cloud of 3D coordinates based on the 3D depth information of the 3D-image-frame $Frm_{3D}$ in the total-image-frame Frm. Furthermore, these points-cloud can be used as "skeleton" part of the color 3D model $M_{3D}$ of the target object 800. In addition, the back-end processor 500 may generate surface texture of the target object 800 according to surface color image of the 2D-image-frame $Frm_{2D}$ in the total-image-frame Frm, and integrate the surface texture into the skeleton part (points-cloud) to form the color 3D model $M_{3D}$ of the target object 800

In addition, the back-end processor 500 or the image processor 400 can perform brightness processing (i.e., auto exposure (AE)) and white balance processing (i.e., auto white balance (AWB)) on the 2D-image-frame $Frm_{2D}$ and the 3D-image-frame $Frm_{3D}$ respectively, to obtain a plurality of parameter calibration values. Furthermore, the first sensor 110 and the second sensor 120 can be dynamically calibrated according to the parameter calibration values, so as to achieve improved visual quality of first surface-color-signal $V_{2D}$-1, second surface-color-signal $V_{2D}$-2, first 3D depth-signal $V_{3D}$-1 and second 3D depth-signal $V_{3D}$-2 generated by the calibrated first sensor 110 and second sensor 120.

The forgoing paragraphs describe a general implementation for the imaging rendering device 1000 of this embodiment, and the following paragraphs describe detailed implementation of each component unit and circuit of the imaging rendering device 1000.

Figure 3:
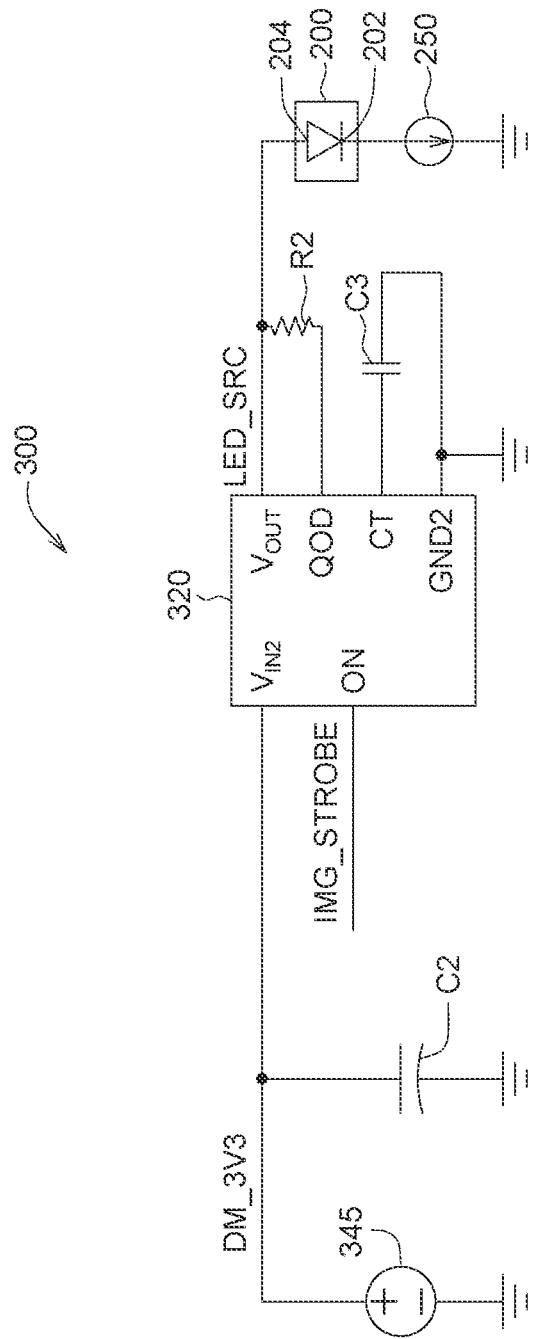
FIG. 3 is a circuit diagram of the load switch and the IR projector of the driving circuit according to an embodiment of this disclosure.
Figure 4:
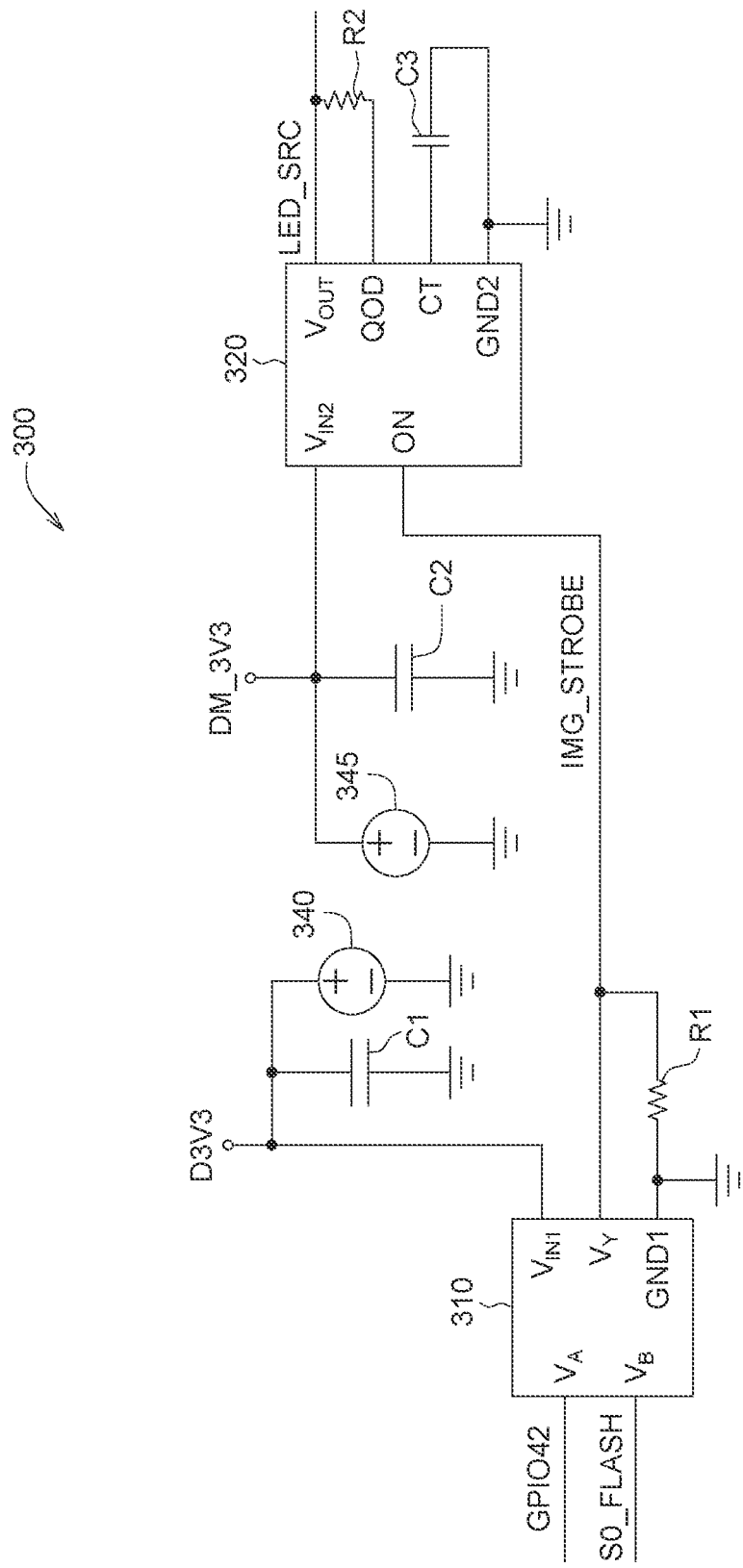
FIG. 4 is a circuit diagram of the driving circuit according to an embodiment of this disclosure.

FIG. 3 is a circuit diagram of the load switch 320 and the IR projector 200 of the driving circuit 300 of an embodiment of this disclosure, and FIG. 4 is a circuit diagram of the driving circuit 300 of an embodiment of this disclosure. Please refer to FIGS. 3 and 4, in this embodiment, the IR projector 200 may refer to, for example, a laser diode in the form of a VECSEL, and the cathode 202 of the IR projector 200 is connected to the ground "GND" through the current source 250, and the anode 204 of the IR projector 200 is connected to the load switch 320 of the driving circuit 300 to receive the driving-signal LED_SRC. In addition to the load switch 320, the driving circuit 300 may further include an AND gate circuit 310. The AND gate circuit 310 may refer to, for example, an AND logic gate realized by a hardware chip, which has at least two input terminals $V_A$, $V_B$, a power voltage source terminal $V_{IN1}$, a ground terminal GND1 and output terminal $V_Y$. The power source terminal $V_{IN1}$ of the AND gate circuit 310 may be connected to the voltage source 340 and the first capacitor C1, and the voltage source 340 may cooperate with the first capacitor C1 to provide the input voltage D3V3. The input voltage D3V3 may be provided to the AND gate circuit 310 via the input terminal $V_{IN1}$ to serve as a DC bias voltage (i.e., an operating voltage) of the AND gate circuit 310. On the other hand, the input terminal $V_A$ of the AND gate circuit 310 receives the control-signal GPIO42 from the image processor 400, and the input terminal $V_B$ receives the strobe-control-signal S0_FLASH from the first sensor 110 and the second sensor 120. The AND gate circuit 310 performs a logical AND operation on the control-signal GPIO42 and the strobe-control-signal S0_FLASH, and the obtained operation result is output as an enabling-signal IMG_STROBE via the output terminal $V_Y$ to be provided to the load switch 320.

Figure 5A:
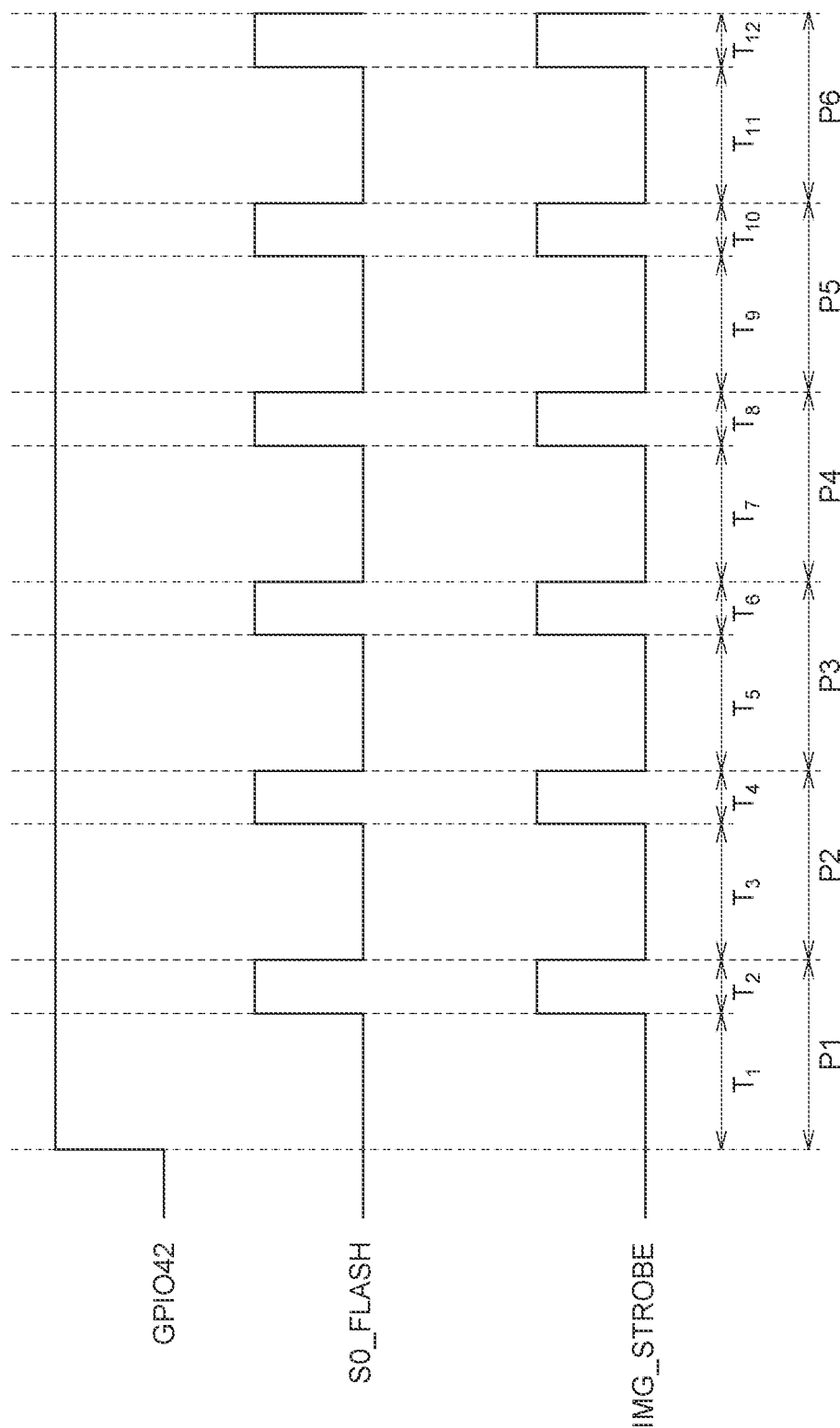

To describe operations of the above three control-signals: strobe-control-signal S0_FLASH, control-signal GPIO42 and enabling-signal IMG_STROBE, please refer to FIGS. 5A and 5B which illustrate timing diagrams of the control signals of the driving circuit 300 according to an embodiment of this disclosure. As shown in FIG. 5A, in one example, when the imaging rendering device 1000 continues to operate in the 3D mode, the image processor 400 may continue to output control-signal GPIO42, which is of high voltage level, to the AND gate circuit 310 of the driving circuit 300. In addition, the first sensor 110 and the second sensor 120 may output a strobe-control-signal S0_FLASH of high voltage level to the AND gate circuit 310 of the driving circuit 300, when first sensor 110 and the second sensor 120 actually sense the target object 800. For example, the first sensor 110 and the second sensor 120 actually perform sensing during time intervals T2, T4, T6, T8, T10, and T12 and output strobe-control-signal S0_FLASH of high voltage level to the AND gate circuit 310. Accordingly, the AND gate circuit 310 obtains a of a high-voltage-level result of the logic AND operation in the time intervals T2, T4, T6, T8, T10, and T12, so that the AND gate circuit 310 in the time intervals T2, T4, T6, T8, T10 and T12 outputs a enabling-signal IMG_STROBE of high-voltage-level to the load switch 320.

In another example, as shown in FIG. 5B, if the imaging rendering device 1000 is switched between the 2D mode and the 3D mode in an interleaved manner, the image processor 400 only outputs a high-voltage-level control-signal GPIO42 to the gate circuit 310 in the 3D mode. For example, the imaging rendering device 1000 operates in the 3D mode during periods P2, P4, and P6, where the period P2 includes time intervals T3 and T4, the period P4 includes time intervals T7 and T8, and the period P6 includes time intervals T11 and T12. Accordingly, the control-signal GPIO42 may be high-voltage-level only in time intervals T3, T4, T7, T8, T11, and T12. Furthermore, the first sensor 110 and the second sensor 120 actually perform sensing only in time intervals T2, T4, T6, T8, T10, and T12 and output the strobe-control-signal S0_FLASH of high-voltage-level. Taking the intersection of time intervals T3, T4, T7, T8, T11, and T12 and time intervals T2, T4, T6, T8, T10, and T12, such intersection refers to time intervals T4, T8, and T12. The enabling-signal IMG_STROBE is high-voltage-level only in the time intervals T4, T8, and T12 (i.e., the time intervals of intersection. Accordingly, the IR projector 200 may be only turned on during the time intervals T4, T8, and T12 during which the first sensor 110 and the second sensor 120 actually perform sensing. On the other hand, when the first sensor 110 and the second sensor 120 do not operate, the IR projector 200 may be turned off, hence power consumption of IR projector 200 may be greatly reduced, and temperature of the IR projector 200 may be decreased to reduce optical loss of IR projector 200 operating at a high temperature.

On the other hand, still referring to FIG. 5B, the imaging rendering device 1000 operates in the 2D mode during periods P1, P3, and P5, where period P1 includes time intervals T1 and T2, period P3 includes time intervals T5 and T6, while period P5 Includes time intervals T9 and T10. The control-signal GPIO42 is at low-voltage-level in time intervals T1, T2, T5, T6, T9, T10, and the enabling-signal IMG_STROBE is also at a low-voltage-level.

Please refer to FIG. 4 again, the output terminal $V_Y$ of the AND gate circuit 310 is further connected to the ground input terminal GND1 through the first resistor R1 to be grounded. Accordingly, switching speed for the enabling-signal IMG_STROBE to switch between high-voltage-level and low-voltage-level may be adjusted by tuning resistance value of the first resistor R1.

As shown in FIG. 4, the load switch 320 may be, for example, a high-speed switch in the form of solid-state device realized by a hardware chip, and the "on-off switching time" of such high-speed switch is in the order of micro-second. The input terminal $V_{IN2}$ of the load switch 320 is connected to the voltage source 345 and the second capacitor C2. Furthermore, the voltage source 345 cooperates with the second capacitor C2 to provide the input voltage DM_3V3. The input voltage DM_3V3 can be provided to the load switch 320 via the input terminal $V_{IN2}$ to serves as a DC bias voltage of the load switch 320. The input terminal ON of the load switch 320 is connected to the output terminal $V_Y$ of the AND gate circuit 310 to receive the enabling-signal IMG_STROBE, and the load switch 320 correspondingly generates the driving-signal LED_SRC in response to the enabling-signal IMG_STROBE. When the enabling-signal IMG_STROBE is at high-voltage-level, the load switch 320 correspondingly generates a high-voltage-level driving-signal LED_SRC, and outputs the driving-signal LED_SRC to the IR projector 200 through the output terminal $V_{OUT}$ to drive and control the IR projector 200.

In this embodiment, the output terminal $V_{OUT}$ of the load switch 320 is connected to the input terminal QOD through the second resistor R2, and the output terminal CT of the load switch 320 is connected to the ground input terminal GND2 through the third capacitor C3. Accordingly, the load switch 320 has a discharge path for the driving-signal LED_SRC. The discharge path refers to the following: a path from the second resistor R2 to the input terminal QOD, a path from the output terminal CT to the third capacitor C3 then to the ground input terminal GND2. When the drive-signal LED_SRC of the output terminal $V_{OUT}$ is switched from high-voltage-level to low-voltage-level, the drive-signal LED_SRC may be quickly discharged through the above-mentioned discharge path so as to direct the residual current of the driving-signal LED_SRC, and thereby increases the switching speed of the driving-signal LED_SRC between high-voltage-level and low-voltage-level. Moreover, the discharging speed of the driving-signal LED_SRC may be adjusted by tuning resistance value of the second resistor R2 and capacitance value of the third capacitor C2. With the mechanism of rapid-discharging of the load switch 320, the driving-signal LED_SRC may be rapidly switched between high-voltage-level and low-voltage-level, so that the IR projector 200 may be rapidly turned on/off. In application, when the imaging rendering device 1000 quickly switches between the 2D mode and the 3D mode in a interleaved mode, the load switch 320 may quickly switch the driving-signal LED_SRC so as to quickly turn on/off the IR projector 200, so that the IR projector 200 may accurately project the IR-dot-pattern IR1 in the 3D mode.

Figure 6:
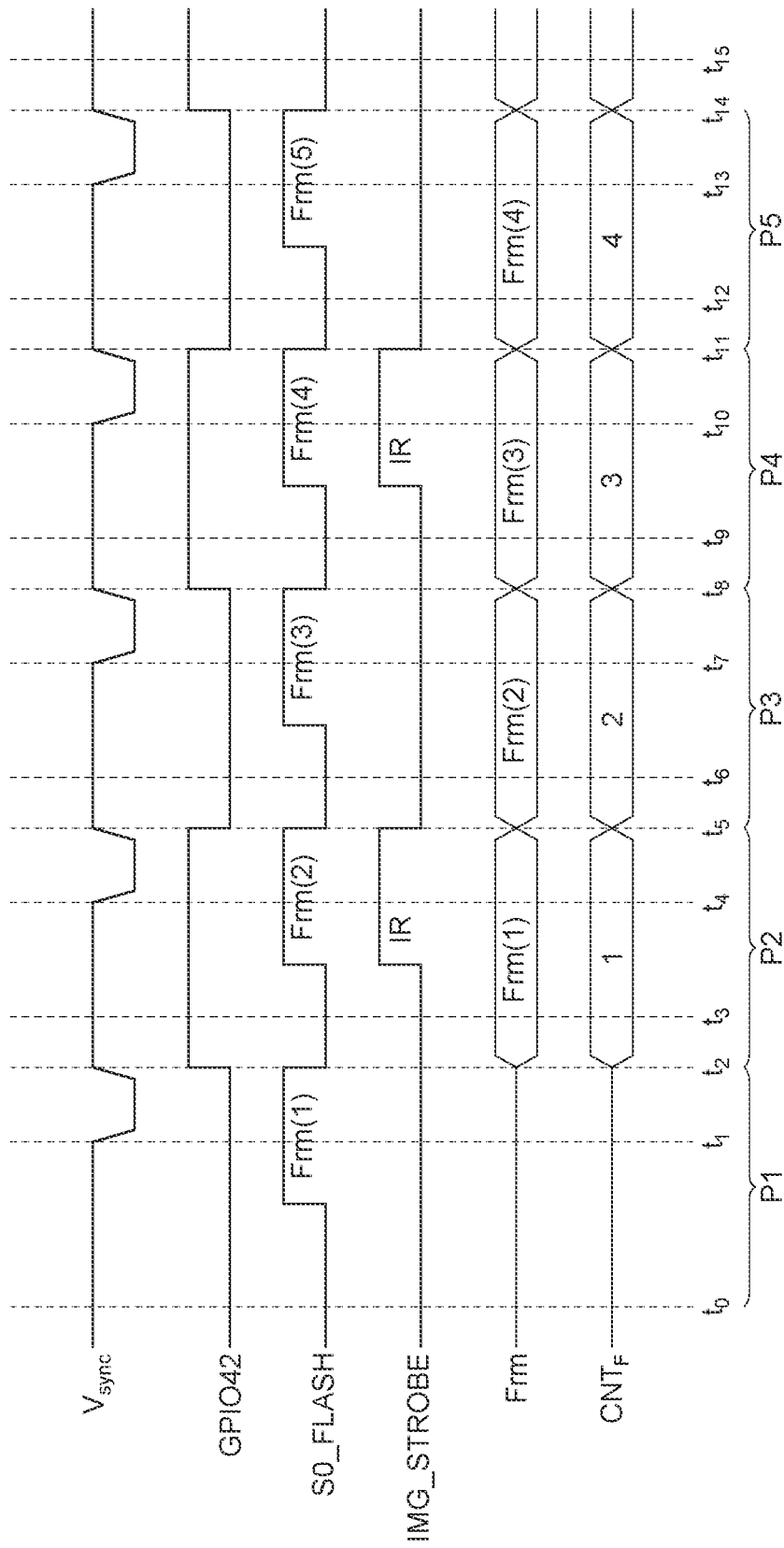
FIG. 6 is a timing diagram of the control signals of the imaging rendering device and the total-image-frame.

Next, detailed implementation for the imaging rendering device 1000 to switch between the 2D mode and the 3D mode in a interleaved manner will be described below. FIG. 6 is a timing diagram of the control-signals of the imaging rendering device 1000 and the total-image-frame Frm. Please refer to FIG. 6 (also see FIGS. 2, 4, and 5B by reference). The image processor 400 may process the surface-color-signal V_2D and the 3D depth-signal V_3D (which are generated by the first and second sensors 110 and 120), and may integrate the surface-color-signal V_2D and the 3D depth-signal V_3D into a total-image-frame Frm in the form of a sequence. The total-image-frame Frm includes the 2D-image-frame $Frm_{2D}$ and the 3D-image-frame $Frm_{3D}$. The image processor 400 may set or insert a count value "$CNT_F$" in the total-image-frame Frm, so as to indicate or denote the currently outputted total-image-frame Frm by the image processor 400. For example, when the count value CNTF is "N", it indicates that the image processor 400 is currently outputting the N-th total-image-frame Frm(N).

The period P1 between time point t0 and time point t2 which are shown in FIG. 6, may correspond to the period P1 including time intervals T1 and T2 which are shown in FIG. 5B. In the period P1, the imaging rendering device 1000 operates in the 2D mode. At this period P1, the control-signal GPIO42 is at low voltage level and hence the IR projector 200 is turned off. Furthermore, during the interval between time point t1 and time point t2 in the period P1, the synchronization control-signal $V_{sync}$ generated by the first sensor 110 and the second sensor 120 is at low voltage level. The parameters of the first sensor 110 and the second sensor 120 may be adjusted and set during the interval between time point t1 and time point t2. Moreover, when the strobe-control-signal S0_FLASH of the first sensor 110 and the second sensor 120 is at high-voltage-level in the period P1, the first sensor 110 and the second sensor 120 may actually sense the target object 800, then, the image processor 400 may generate the first one of total-image-frame Frm (referred to as "Frm(1)") according to the sensing results of the first sensor 110 and the second sensor 120. Meanwhile, in the period P1 the count value $CNT_F$ has not started counting, which means, the image processor 400 has not output the first total-image-frame Frm(1).

Then, the period P2 between time point t2 and time point t5 which are shown in FIG. 6, may correspond to the period P2 including time intervals T3 and T4 which are shown in FIG. 5B. In the period P2. In the period P2, the imaging rendering device 1000 operates in a 3D mode. At time point t2, the synchronization control-signal $V_{sync}$ of the first sensor 110 and the second sensor 120 is raised to high-voltage-level, and the control-signal GPIO42 is also raised to high-voltage-level to turn on the IR projector 200. Furthermore, the count value $CNT_F$ is accumulated to "1". Meanwhile, the image processor 400 outputs the first total-image-frame Frm(1) generated in the previous period P1. Then, when the strobe-control-signal S0_FLASH is at high-voltage-level, the first sensor 110 and the second sensor 120 actually sense the target object 800. And, according to the sensing result of the first sensor 110 and the second sensor 120, the image processor 400 generates the second total-image-frame Frm (2). When the strobe-control-signal S0_FLASH is at high-voltage-level, the enabling-signal IMG_STROBE is also at high-voltage-level, at the same time, which may cause IR projector 200 turned-on. Then, in the period between time points t4 and t5, the image processor 400 performs brightness processing (AE) and white balance processing (AWB) according to the previous total-image-frame Frm(1) to obtain a plurality of parameter calibration values (regarding brightness and white balance) of the first sensor 110 and the second sensor 120. The parameter calibration values obtained in the period P2 will be used to set or calibrate the first sensor 110 and the second sensor 120 in the next two period (i.e., period P4).

The period P3 between time point t5 and time point t8 which are shown in FIG. 6, may correspond to the period P3 including time intervals T5 and T6 which are shown in FIG. 5B. In the period P3, the imaging rendering device 1000 operates in the 2D mode, therefore, the control-signal GPIO42 is reduced to low voltage level at the time point t5, and hence the IR projector 200 is turned off. Then, when the strobe-control-signal S0_FLASH is at high-voltage-level, the first sensor 110 and the second sensor 120 actually sense the target object 800, and the image processor 400 correspondingly generates a third total-image-frame Frm(3). In the period P3, the count value $CNT_F$ is accumulated to "2". Meanwhile, the image processor 400 outputs the total-image-frame Frm(2) generated in the previous period P2. Furthermore, in the period between time points t7 and t8, the image processor 400 obtains parameter calibration values according to brightness processing (AE) and white balance processing (AWB) of the previous total-image-frame Frm (2). These parameter calibration values may be used to set and calibrate the parameters of the first sensor 110 and the second sensor 120 in next two periods (i.e., period P5).

In this embodiment, when the count value $CNT_F$ is odd numbers of 1, 3, 5 . . . , corresponding total-image-frames Frm(1), Frm(3), Frm(5) . . . are 2D-image-frames $Frm_{2D}$ in 2D mode. Furthermore, the image processor 400 may obtain parameter calibration values according to brightness processing and white balance processing of the total-image-frames Frm(1) and Frm(3). These parameter calibration values are used in the periods P3 and P5 to set or calibrate parameters related to brightness and white balance of the first sensor 110 and the second sensor 120, so as to generate total-image-frames Frm(3) and Frm(5). On the other hand, when the count value $CNT_F$ is even numbers of 2, 4, 6, . . . , corresponding total-image-frames Frm(2), Frm(4), Frm(6), . . . are 3D-image-frames $Frm_{3D}$ in 3D mode. Furthermore, the image processor 400 may set or calibrate first sensor 110 and second sensor 120 according to parameter calibration values obtained by brightness processing and white balance processing of total-image-frames Frm(2) and Frm(4) in periods P4 and P6, so as to generate total-image-frames Frm(4) and Frm(6). From the above, according to the count value $CNT_F$, the back-end processor 500 may determine that the currently outputted total-image-frame Frm refers to a 2D-image-frame $Frm_{2D}$ or a 3D-image-frame $Frm_{3D}$. Furthermore, the back-end processor 500 perform image processing respectively on 2D-image-frames $Frm_{2D}$ (corresponding to Frm(1), Frm(3), Frm(5), . . . ) and 3D-image-frames $Frm_{3D}$ (corresponding to Frm(2), Frm(4), Frm(6), . . . ) so as to set the first sensor 110 and the second sensor 120. In addition, in this embodiment, the frame rate of 2D-image-frames $Frm_{2D}$ and 3D-image-frames $Frm_{3D}$ are both 30 fps, which is one-half of frame rate 60 fps of the display.

Figure 7:
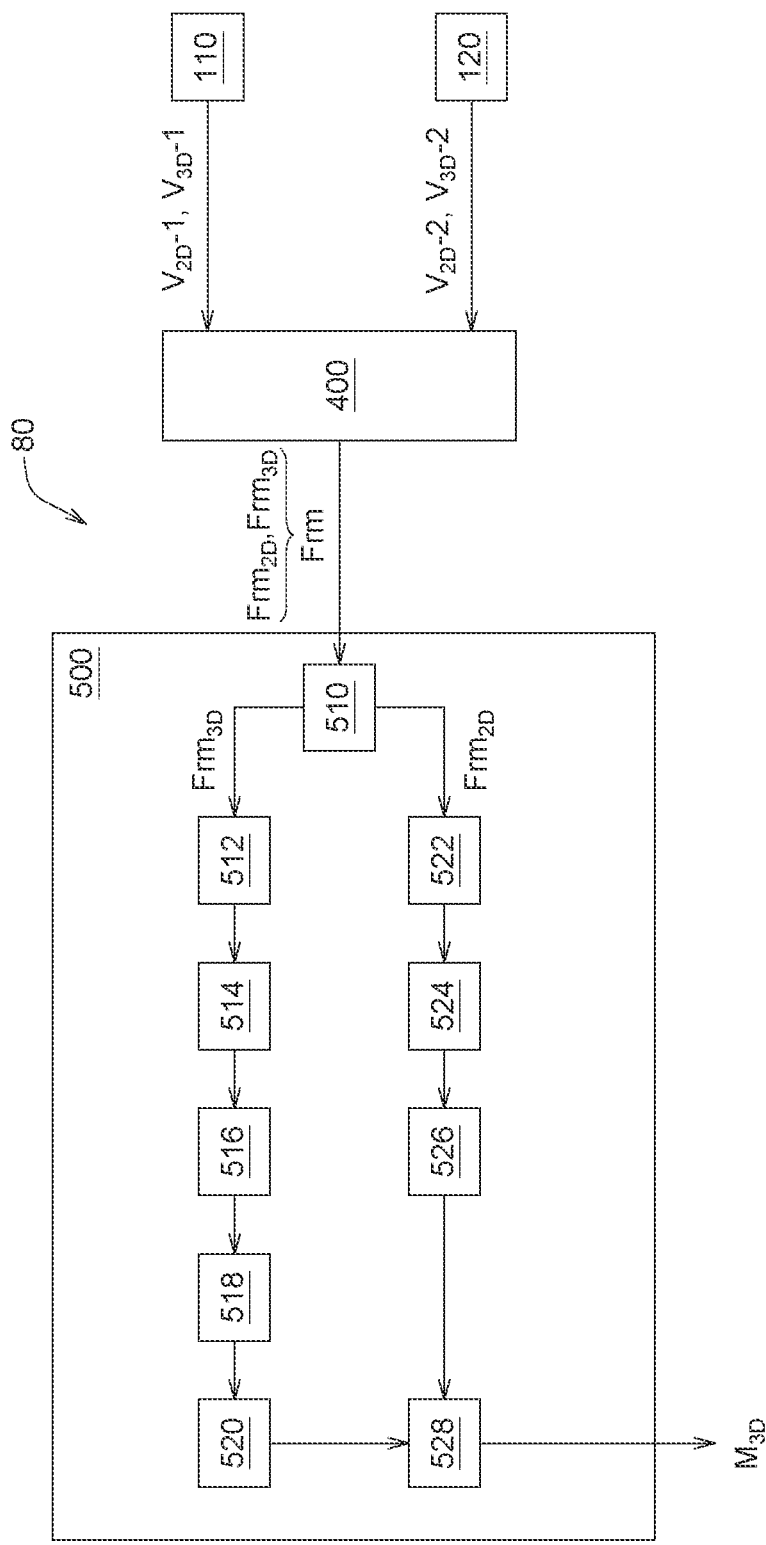
FIG. 7 is a schematic diagram illustrating operation of the back-end processor according to an embodiment of this disclosure.

FIG. 7 is a schematic diagram illustrating operation of the back-end processor 500 according to an embodiment of this disclosure. Please refer to FIG. 7, before the frame sequence of the total-image-frames Frm is transmitted to the back-end processor 500 for processing, the image processor 400 may process the first surface-color-signal $V_{2D}$-1 received from the first sensor 110 and the second surface-color-signal $V_{2D}$-2 received from the second sensor 120 to obtain the frame sequence of the 2D-image-frames $Frm_{2D}$. Furthermore, the image processor 400 may process the first 3D-depth-signal $V_{3D}$-1 received from the first sensor 110 and the second 3D-depth-signal $V_{3D}$-2 received from the second sensor 120 to obtain the frame sequence of the 3D-image-frames $Frm_{3D}$. The image processor 400 may perform multiplexing on the frame sequence of the 2D-image-frames $Frm_{2D}$ and the frame sequence of the 3D-image-frames $Frm_{3D}$ so as to integrate as total-image-frames Frm.

Then, the image processor 400 may transmit the frame sequence of the multiplexed total-image-frames Frm to the back-end processor 500 via a serial interface. The back-end processor 500 may firstly de-multiplex the frame sequence of the total-image-frames Frm to obtain the frame sequence of the 3D-image-frames $Frm_{3D}$ and the frame sequence of the 2D-image-frames $Frm_{2D}$ by a de-multiplexing processing unit 510. In this embodiment, the 3D-image-frames $Frm_{3D}$ or the 2D-image-frames $Frm_{2D}$ may be identified according to the count value $CNT_F$ embedded in the total-image-frames Frm.

In a processing path of the back-end processor 500, the back-end processor 500 may process the 3D-image-frames $Frm_{3D}$. Since the content of the 3D-image-frames $Frm_{3D}$ includes the first 3D-depth-signal $V_{3D}$-1 generated by the first sensor 110 and the second 3D-depth-signal $V_{3D}$-2 generated by the second sensor 120, synchronization needs to be performed on the signals of the two different sensors (i.e., first sensor 110 and second sensor 120). Therefore, the back-end processor 500 may firstly synchronize the 3D-image-frames $Frm_{3D}$ by the first synchronization processing unit 512 Furthermore, since the frame sequence of the total-image-frames Frm may be compressed before being transmitted from the image processor 400 to the back-end processor 500 to save transmission bandwidth, the back-end processor 500 then perform decompression-processing on the 3D-image-frames $Frm_{3D}$ by the decompression-processing unit 514. Then, noise-reduction processing unit 516 may performs noise-reduction filtering on the 3D-image-frames $Frm_{3D}$ to eliminate or suppress noise in the 3D-image-frames $Frm_{3D}$. Then, the points-cloud generating unit 518 may calculate depth information and distance information of each point in the image of the 3D-image-frame $Frm_{3D}$, and converts them into 3D coordinates of each point. These points with 3D coordinates may constitute the points-cloud of the target object 800. Then, the points-cloud filtering processing unit 520 may perform filtering processing on the points-cloud, and the points-cloud may be used as the "skeleton" part of the color 3D model $M_{3D}$ of the target object 800.

On the other hand, in another processing path of the back-end processor 500, the back-end processor 500 may process the 2D-image-frames $Frm_{2D}$. Firstly, the decompression and decoding unit 522 performs decompression-processing and decoding processing on the 2D-image-frames $Frm_{2D}$, so as to recover the compressed 2D-image-frames $Frm_{2D}$ to a normal data format. Then, the frame rate of the 2D-image-frames $Frm_{2D}$ is converted to a frame rate suitable for the display, by the frame rate conversion unit 524. In this embodiment, the 2D-image-frame $Frm_{2D}$ with a frame rate of 30 fps is upgraded to a frame rate of 60 fps suitable for a display. Then, the image filtering processing unit 526 performs filtering processing to smooth the color image of the 2D-image-frame $Frm_{2D}$ to improve visual quality of the 2D-image-frame $Frm_{2D}$.

Finally, the back-end processor 500 integrates the processing path of the 3D-image-frame $Frm_{3D}$ and the processing path of the 2D-image-frame $Frm_{2D}$, and the obtained points-cloud from the processed 3D-image-frames $Frm_{3D}$ and the obtained surface color images from the processed 2D-image-frame $Frm_{2D}$. are integrated. Then, the second synchronization processing unit 528 performs synchronization processing to obtain the color 3D model $M_{3D}$ of the target object 800, and the color 3D model $M_{3D}$ is displayed on the display or transmitted to other storage devices.

Figure 8A:
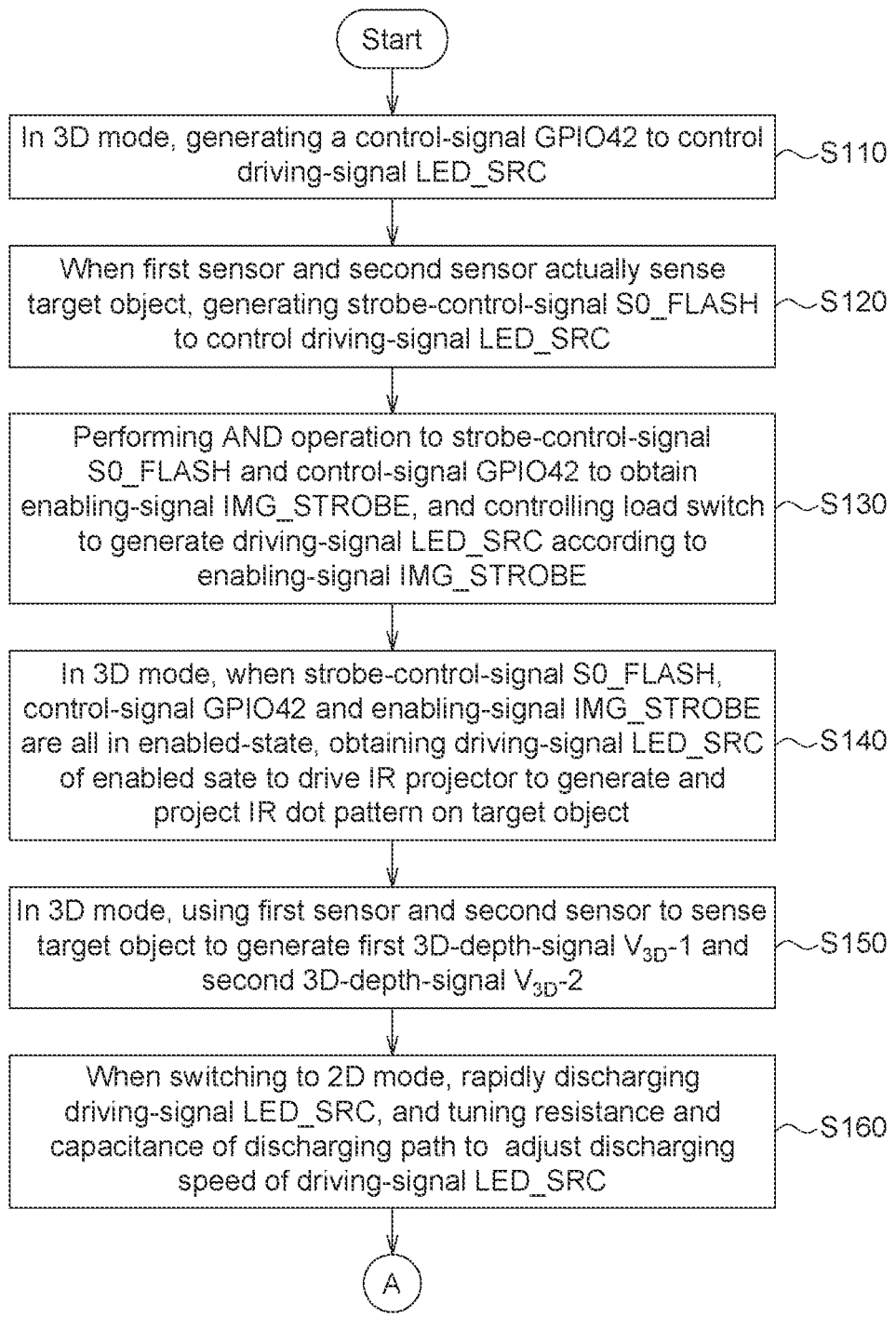
FIGS. 8A and 8B are flow diagrams of the image rendering method according to an embodiment of this disclosure.
Figure 8B:
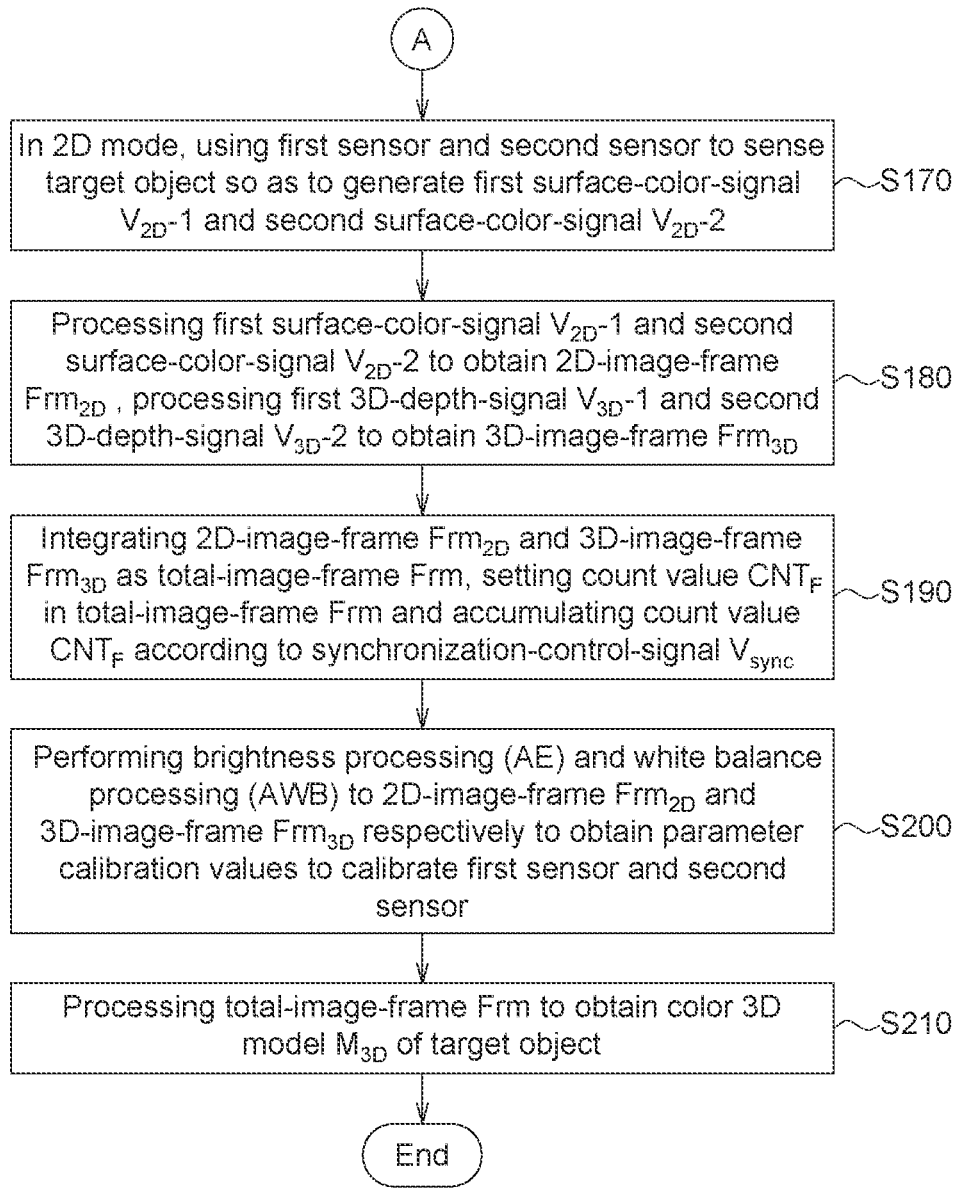

FIGS. 8A and 8B are flow diagrams of the image rendering method according to an embodiment of this disclosure. The image rendering method of this embodiment may be used to generate the color 3D image of the target object 800, and the image rendering method may be carried out with the image rendering device 1000 of FIGS. 2 to 4. Please refer to FIG. 8A, firstly, in step S110, the image processor 400 generates the control-signal GPIO42. When the image rendering device 1000 is operated in the 3D mode, the control-signal GPIO42 is in an enabled state (for example, in a state of high voltage level). Furthermore, the driving-signal LED_SRC is controlled by the control-signal GPIO42. Then, in step S120, the strobe-control-signal S0_FLASH is generated by the first sensor 110 and the second sensor 120. When the first sensor 110 and the second sensor 120 actually sense the target object 800, the strobe-control-signal S0_FLASH is in an enabled state (for example, in a state of high voltage level). In addition, the driving-signal LED_SRC is controlled by the strobe-control-signal S0_FLASH. Then, in step S130, the strobe-control-signal S0_FLASH and the control-signal GPIO42 are performed by logic AND operation by the AND gate circuit 310 of the driving circuit 300 to obtain the enabling-signal IMG_STROBE. Furthermore, the driving-signal LED_SRC is generated by the load switch 320 of the driving circuit 300, wherein the driving-signal LED_SRC may be further controlled by the enable-signal IMG_STROBE.

Then, in step S140, when operating in the 3D mode and when the first sensor 110 and the second sensor 120 actually sense the target object 800, the strobe-control-signal S0_FLASH, the control-signal GPIO42 and the enabling-signal IMG_STROBE are all in an enabled state (for example, in a state of high voltage level), the driving-signal LED_SRC is also in an enabled state. The IR projector 200 may be driven by the driving-signal LED_SRC to generate an IR-dot-pattern IR1, and IR-dot-pattern IR1 may be projected on the target object 800. Then, in step S150, in the 3D mode, the target object 800 is sensed by the first sensor 110 to generate a first 3D-depth-signal $V_{3D}$-1, and the target object 800 is sensed by the second sensor 120 to generate a second 3D-depth-signal $V_{3D}$-2. Then, in step S160, when the image rendering device 1000 is operated in the 2D mode, the driving-signal LED_SRC is rapidly discharged through the discharge path of the load switch 320, so as to switch the driving-signal LED_SRC from the enabled state to disabled state, and the discharging speed of the driving-signal LED_SRC is adjusted by tuning the resistance (of second resistor R2) and capacitance (of third capacitor C3) of the discharge path.

Next, please refer to FIG. 8B. Then in step S170, when the image rendering device 1000 is operated in the 2D mode, the target object 800 is sensed by the first sensor 110 to generate the first surface-color-signal $V_{2D}$-1, and the target object 800 is sensed by the second sensor 120 to generate a second surface-color-signal $V_{2D}$-2. Then, in step S180, the first surface-color-signal $V_{2D}$-1 and the second surface-color-signal $V_{2D}$-2 are processed to obtain 2D-image-frames $Frm_{2D}$, and a frame sequence of the 2D-image-frames $Frm_{2D}$ are formed. Furthermore, the first 3D-depth-signal $V_{3D}$-1 and the second 3D-depth-signal $V_{3D}$-2 are processed to obtain a 3D-image-frames $Frm_{3D}$, and a frame sequence of the 3D-image-frames $Frm_{3D}$ is formed. Then, in step S190, the 2D-image-frame $Frm_{2D}$ and the 3D-image-frame $Frm_{3D}$ are integrated as a total-image-frame Frm, and a frame sequence of the total-image-frames Frm is formed. Moreover, a count value $CNT_F$ is set in the total-image-frame Frm, wherein the values of odd number or even number of the count value $CNT_F$ correspond to the 2D-image-frame $Frm_{2D}$ or the 3D-image-frame $Frm_{3D}$, respectively. The first sensor 110 and the second sensor 120 generate a synchronization-control-signal $V_{sync}$, and accumulate the count value $CNT_F$ according to the synchronization-control-signal $V_{sync}$. Then, in step S200, brightness processing and white balance processing are performed on the 2D-image-frame $Frm_{2D}$ and the 3D-image-frame $Frm_{3D}$ to obtain parameter calibration values, and the first sensor 110 and the second sensor 120 are calibrated according to parameter calibration values.

Then, in step S210, the total-image-frame Frm is processed to obtain a color 3D model $M_{3D}$ of the target object 800. Processing method for obtaining color 3D model $M_{3D}$ includes: performing synchronization processing on the 3D-image-frame $Frm_{3D}$, performing decompression on the 3D-image-frame $Frm_{3D}$, performing noise reduction and filtering processing on the 3D-image-frame $Frm_{3D}$, and calculating of depth information and distance information of each point in the image of the 3D-image-frame $Frm_{3D}$ to build points-cloud and performing filtering processing on the points-cloud. Furthermore, performing decompression and decoding processing on the 2D-image-frame $Frm_{2D}$, converting the frame rate of the 2D-image-frame $Frm_{2D}$ to a frame rate suitable for the display, and performing filtering processing (e.g. smoothing) color image of the 2D-image-frame $Frm_{2D}$. Then, the points-cloud obtained by processing the 3D-image-frame $Frm_{3D}$ and the surface color image obtained by processing the 2D-image-frame $Frm_{2D}$ are integrated to obtain a color 3D model $M_{3D}$ of the target object 800.

It will be apparent to those skilled in the art that various modifications and variations can be made to the disclosed embodiments. It is intended that the specification and examples be considered as exemplary only, with a true scope of this disclosure being indicated by the following claims and their equivalents.

What is claimed is:

1. An image rendering device, comprising:
   a first sensor, configured to sense a target object in a three-dimensional (3D) mode to generate a first 3D-depth-signal, and sense the target object in a two-dimensional (2D) mode to generate a first surface-color-signal;
   a second sensor, configured to sense the target object in the 3D mode to generate a second 3D-depth-signal, and sense the target object in the 2D mode to generate a second surface-color-signal;
   an infrared ray (IR) projector, configured to generate an IR dot pattern; and
   a processor, configured to control the IR projector to project the IR dot pattern on the target object in the 3D mode, and process the first surface-color-signal, the second surface-color-signal, the first 3D-depth-signal and the second 3D-depth-signal to obtain a color 3D model of the target object.

2. The image rendering device according to claim 1, further comprising:
   a driving circuit, configured to generate a driving-signal, and drive the IR projector by the driving-signal to generate the IR dot pattern in the 3D mode;
   wherein the processor further generates a control-signal, and control the driving circuit by the control-signal to generate the driving-signal in the 3D mode.

3. The image rendering device according to claim 2, wherein the first sensor and the second sensor further generate a strobe-control-signal, and when the first sensor and the second sensor actually sense the target object, the strobe-control-signal is used to control the driving circuit to generate the driving-signal.

4. The image rendering device according to claim 3, wherein the driving circuit comprising:
   an AND gate circuit, configured to perform a logic AND operation on the strobe-control-signal and the control-signal to obtain an enabling-signal; and
   a load switch, configured to generate the driving-signal, and control the driving-signal by the enabling-signal;
   wherein, when operating in the 3D mode and when the first sensor and the second sensor actually sense the target object, the strobe-control-signal, the control-signal and the enabling-signal are all in a enabled state so as to control the driving-signal as being in the enabled state.

5. The image rendering device according to claim 4, wherein the load switch is a high-speed switch of a solid-state device, the load switch has a discharging path to rapidly discharge the driving-signal, and the discharging path has a resistor and a capacitor used to adjust the discharging speed of the driving-signal.

6. The image rendering device according to claim 1, wherein the processor is configured to process the first surface-color-signal and the second surface-color-signal to obtain a plurality of 2D-image-frames and form a frame sequence of the 2D-image-frames, and process the first 3D-depth-signal and the second 3D-depth-signal to obtain a plurality of 3D-image-frames and form a frame sequence of the 3D-image-frames, and integrate the 2D-image-frames and the 3D-image-frames as a plurality of total-imageframes and from a frame sequence of the total-image-frames, and process the total-image-frames to obtain a color 3D model of the target object.

7. The image rendering device according to claim 6, wherein the processor is configured to set a count value in the total-image-frames, and values of odd number or even number of the count value correspond to the 2D-image-frames or the 3D-image-frames.

8. The image rendering device according to claim 7, wherein the first sensor and the second sensor further generate a synchronization-control-signal, and the processor is configured to accumulate the count value according to the synchronization-control-signal.

9. The image rendering device according to claim 8, wherein the processor is configured to perform brightness processing and white balance processing on the 2D-image-frames and the 3D-image-frames to obtain a plurality of parameter calibration values, and to calibrate the first sensor and the second sensor according to the parameter calibration values.

10. An image rendering method, comprising:
   generating an infrared ray (IR) dot pattern by an IR projector;
   projecting the IR dot pattern on the target object in a three-dimensional (3D) mode;
   sensing the target object by the first sensor in the 3D mode to generate a first 3D-depth-signal;
   sensing the target object by the second sensor in the 3D mode to generate a second 3D-depth-signal;
   sensing the target object by the first sensor in a two-dimensional (2D) mode to generate a first surface-color-signal;
   sensing the target object by the second sensor in the 2D mode to generate a second surface-color-signal;
   processing the first surface-color-signal and the second surface-color-signal to obtain a plurality of 2D-image-frames and forming a frame sequence of the 2D-image-frames;
   processing the first 3D-depth-signal and the second 3D-depth-signal to obtain a plurality of 3D-image-frames and forming a frame sequence of the 3D-image-frames;
   integrating the 2D-image-frames and the 3D-image-frames as a plurality of total-image-frames and forming a frame sequence of the total-image-frames; and
   processing the total-image-frames to obtain a color 3D model of the target object.

11. The image rendering method according to claim 10, further comprising:
   generating a driving-signal by a driving circuit;
   driving the IR projector by the driving-signal to generate the IR dot pattern in the 3D mode;
   generating a control-signal; and
   controlling the driving-signal by the control-signal in the 3D mode.

12. The image rendering method according to claim 11, further comprising:
   generating a strobe-control-signal by the first sensor and the second sensor; and
   when the first sensor and the second sensor actually sense the target object, controlling the driving-signal by the strobe-control-signal.

13. The image rendering method according to claim 12, wherein the driving circuit comprises an AND gate circuit and a load switch, and the image rendering method further comprising:
   performing a logic AND operation on the strobe-control-signal and the control-signal by the AND gate circuit to obtain an enabling-signal; and
   generating the driving-signal by the load switch, and controlling the driving-signal by the enabling-signal;
   wherein, when operating in the 3D mode and when the first sensor and the second sensor actually sense the target object, the strobe-control-signal, the control-signal and the enabling-signal are all in an enabled state so as to control the driving-signal as being in the enabled state.

14. The image rendering method according to claim 13, wherein the load switch is a high-speed switch of a solid-state device, the load switch has a discharging path and the discharging path has a resistor and a capacitor, and the image rendering method further comprising:
   rapidly discharging the driving-signal through the discharging path; and
   adjusting discharging speed of the driving-signal by tuning the resistance and the capacitance of the discharging path.

15. The image rendering method according to claim 10, further comprising:
   setting a count value in the total-image-frames; and
   corresponding values of odd number or even number of the count value to the 2D-image-frames or the 3D-image-frames respectively.

16. The image rendering method according to claim 15, further comprising:
   generating a synchronization-control-signal by the first sensor and the second sensor; and
   accumulating the count value according to the synchronization-control-signal.

17. The image rendering method according to claim 16, further comprising:
   performing brightness processing and white balance processing on the 2D-image-frames and the 3D-image-frames respectively to obtain a plurality of parameter calibration values; and
   calibrating the first sensor and the second sensor according to the parameter calibration values.

* * * * *